US008877102B2

(12) United States Patent
Bernard et al.

(10) Patent No.: US 8,877,102 B2
(45) Date of Patent: *Nov. 4, 2014

(54) MINERAL WOOL, INSULATING PRODUCT AND PRODUCTION METHOD

(75) Inventors: Jean-Luc Bernard, Clermont (FR); Jérôme Douce, Paris (FR)

(73) Assignee: Saint-Gobain Isover, Courbevoie (FR)

( * ) Notice: Subject to any disclaimer, the term of this patent is extended or adjusted under 35 U.S.C. 154(b) by 1014 days.

This patent is subject to a terminal disclaimer.

(21) Appl. No.: 11/910,325

(22) PCT Filed: Mar. 31, 2006

(86) PCT No.: PCT/FR2006/050280
§ 371 (c)(1),
(2), (4) Date: Mar. 31, 2008

(87) PCT Pub. No.: WO2006/103375
PCT Pub. Date: Oct. 5, 2006

(65) Prior Publication Data
US 2008/0191179 A1 Aug. 14, 2008

(30) Foreign Application Priority Data

Apr. 1, 2005 (FR) .................................. 05 50860

(51) Int. Cl.
| | | |
|---|---|---|
| C09K 21/00 | (2006.01) |
| E04B 1/74 | (2006.01) |
| C09D 5/14 | (2006.01) |
| C09D 5/16 | (2006.01) |
| C09D 5/18 | (2006.01) |
| C08G 79/02 | (2006.01) |
| C03C 13/06 | (2006.01) |
| B32B 9/00 | (2006.01) |
| B32B 19/00 | (2006.01) |
| B32B 9/04 | (2006.01) |
| C03C 25/14 | (2006.01) |
| C03C 25/42 | (2006.01) |
| C03C 25/26 | (2006.01) |
| C03C 13/00 | (2006.01) |
| C03C 25/34 | (2006.01) |

(52) U.S. Cl.
CPC ............ C03C 25/26 (2013.01); C03C 2213/02 (2013.01); C03C 25/14 (2013.01); C03C 25/42 (2013.01); C03C 13/00 (2013.01); C03C 25/34 (2013.01)
USPC ............. 252/601; 501/36; 428/688; 428/704; 528/167; 106/15.05; 106/18.14; 106/18.18; 252/62

(58) Field of Classification Search
USPC ................ 501/36; 524/101, 127; 528/167; 428/447; 536/4; 260/2, 45.8, 45.7; 568/387; 525/387; 252/601, 62; 106/15.05, 15.14, 18.18
See application file for complete search history.

(56) References Cited

U.S. PATENT DOCUMENTS

| | | | | | |
|---|---|---|---|---|---|
| 3,235,536 | A | * | 2/1966 | Garner | 525/387 |
| 4,322,523 | A | * | 3/1982 | Wagner | 536/1.11 |
| 4,415,719 | A | * | 11/1983 | Schmidt et al. | 528/167 |
| 5,166,253 | A | * | 11/1992 | Machado | 524/452 |
| 5,658,836 | A | | 8/1997 | Rapp et al. | |
| 2003/0181306 | A1 | * | 9/2003 | Bernard et al. | 501/36 |
| 2004/0051087 | A1 | * | 3/2004 | Thewes et al. | 252/606 |

FOREIGN PATENT DOCUMENTS

| | | | | | |
|---|---|---|---|---|---|
| CH | 648628 | * | 3/1985 | | E04B 1/94 |
| DE | 10317487 | A1 * | 1/2004 | | C08K 5/49 |
| DK | 123162 | * | 5/1972 | | |
| EP | 1 265 821 | | 12/2004 | | |
| JP | 2005170963 | * | 6/2005 | | C08L 101/00 |
| SU | 876623 | * | 10/1981 | | |
| WO | WO 93/13026 | * | 7/1993 | | C03B 37/07 |
| WO | WO 97/17305 | * | 5/1997 | | C08B 37/055 |
| WO | WO 97/20782 | * | 6/1997 | | C03C 13/02 |
| WO | WO0168546 | A1 * | 9/2001 | | C03C 13/00 |

OTHER PUBLICATIONS

Compagno et al Biotechniolgy Letters vol. 14 No. 6 1992 pp. 495-498.*
IPPC European Commision Dec. 2001 Best AvailableTechniques in the Glass Industry pp. 57-59 {http://eippcb.jrc.es/reference/BREF/gls_bref_1201.pdf}.*
USPTO interpreter Source: Langenscheidts Dictionary Techology and applied Sciences Munichen DE 2002 p. 349 {Langenscheidts Fachwörterbuch Technik u. angewandte Wissenschften Deutsch-Englisch 2002 Auflage ISBN 3-86117-187-2 ; p. 349}.*
Golden Glow Paints Glossary of Paint Terms Online Apr. 23, 2001.*

* cited by examiner

*Primary Examiner* — Patrick Ryan
*Assistant Examiner* — Aaron Greso
(74) *Attorney, Agent, or Firm* — Oblon, Spivak, McClelland, Maier & Neustadt, L.L.P.

(57) ABSTRACT

The invention relates to thermally-stable mineral wool which can dissolve in a physiological medium, comprising fibres containing the following constituents, expressed in percentage by weight, namely: 35-60 % $SiO_2$, preferably 39-55 %; 12-27% $Al_2O_3$, preferably 16-25%; 0-35% CaO, preferably 3-25%; 0-30% MgO, preferably 0-15%; 0-17% $Na_2O$, preferably 6-12%; 0-17% $K_2O$, preferably 3-12%; 10-17% $R_2O$ ($Na_2O+K_2O$), preferably 12-17%; 0-5% $P_2O_5$, preferably 0-2%; 0-20% $Fe_2O_3$; 0-8% $B_2O_3$, preferably 0-4%; and 0-3% $TiO_2$, and at least one phosphorous compound that can react with said fibres at a temperature of less than 1000° C. in order to form a coating on the surface thereof. The invention is characterised in that the phosphorous content of said compound, as expressed in phosphorus atom weight, varies between 0.0005%, in particular more than 0.01%, and 1%, in particular less than 0.5%, of the total weight of the fibres. The invention is also characterised in that a phosphorus compound is a molecule in which the phosphorus atom(s) are bound to at least one carbon atom either directly or by means of an oxygen atom.

33 Claims, No Drawings

MINERAL WOOL, INSULATING PRODUCT AND PRODUCTION METHOD

The present invention relates to the field of artificial mineral wools. It relates more particularly to mineral wools intended for manufacturing thermal and/or acoustic insulation materials or soilless cultivation substrates, and especially to thermally stable mineral wools intended for applications in which temperature resistance is important.

These mineral wools are capable of playing an important role in the fire resistance of structural systems into which they are incorporated.

The invention relates more particularly to mineral wools of the rock wool type, that is to say those in which the chemical compositions involve a high liquidus temperature and great fluidity at their fiberizing temperature, combined with a high glass transition temperature.

Conventionally, this type of mineral wool is fiberized by what are termed "external" centrifugal processes, for example of the type of those using a cascade of spinning wheels supplied with molten material by a static delivery device, as described for example in Patent EP-0 465 310 or Patent EP-0 439 385.

The fiberizing process termed "internal" centrifugal process, that is to say one making use of spinners rotating at high speed and pierced by orifices, is, in contrast, conventionally reserved for fiberizing mineral wool of the glass wool type, having broadly a composition relatively rich in alkali metal oxides and a low alumina content, a lower liquidus temperature, the viscosity of the wool at the liquidus temperature being higher than that of rock wool or basalt wool. This process is described for example in Patent EP-0 189 354 or Patent EP-0 519 797.

However, technical solutions allowing the internal centrifugal process to be adapted to the fiberizing of rock wool have recently been developed, especially by modifying the composition of the constituent material of the spinners and of their operating parameters. For more details on this subject, the reader may refer especially to patent WO 93/02977. Such adaptation consequently makes it possible to combine properties that hitherto have only been inherent to one or other of the two types of wool, namely rock wool or glass wool. Thus the rock wool obtained by an internal centrifugal process is of a quality comparable to that of glass wool, with a lower content of unfiberized particles than in conventionally obtained rock wool. However, it retains the two key advantages associated with its chemical nature, namely a low chemical material cost and a high temperature resistance.

Two approaches are therefore now possible for fiberizing rock wool, the choice of one or other depending on a number of criteria, including the required level of quality for the intended application and that of industrial and economic feasibility.

Added to these criteria has been, for a few years, that of a biodegradability of the mineral wool, namely its capability of rapidly dissolving in a physiological medium, with a view to preventing any potential pathogenic risk associated with the possible accumulation of the finest fibers in an organism by inhalation.

Furthermore, a large number of mineral wool applications use the remarkable thermal stability property that certain mineral wool compositions have. In particular, it is known that the thermal stability of mineral wool obtained from iron-enriched slag or basalt is known.

The thermal stability of mineral wool is in particular essential for permitting its use in fire-resistant construction systems. One of the key points of fire resistance lies in the capability of the fiber blanket not collapsing (and in thus retaining its thermal insulation properties), this capability stemming from the fact that the fibers undergo no creep or sintering.

Patent application WO 01/68546 discloses a mineral wool made thermally stable by the simultaneous use of a particular glass composition and of a phosphorus compound capable of reacting above 100° C. with the fibers to form a refractory coating that limits both creep and sintering of the fibers.

The phosphorus compounds described in that application are phosphates or polyphosphates, mainly ammonium or sodium phosphates or polyphosphates. These compounds, deposited with the binder on the surface of the fibers, react above 100° C. with the surface of the fibers, releasing acid compounds, such as phosphoric acid and/or phosphoric anhydride, which react, depending on the particular chemical composition of the fibers, with the alkaline-earth ions of said fibers to form the above mentioned refractory coating on their surface.

It appears that the implementation of the above invention is not without drawbacks in use. The phosphates disclosed in application WO 01/68546 are slightly sensitive, on the one hand, to moisture (when in the polyphosphate state) and, on the other hand, to temperature. The release of acid compounds at relatively low temperature seems to be prejudicial to adhesion between the fibers and the resin-based binder (the resin of which is polymerized in an oven at temperatures of about 200° C.), and seems to be the origin of a reduction in the mechanical properties of the end product and above all in the long-term stability of said mechanical properties.

It is therefore an object of the present invention to obviate the aforementioned drawbacks by improving the chemical composition of the fibers that mineral wool of the rock wool type contains, so as to give them the capability of being fiberized by the internal centrifugal process, improved mechanical and ageing properties, good thermal stability and good solubility properties in a physiological medium.

The subject of the invention is a thermally stable mineral wool capable of dissolving in a physiological medium, which comprises fibers whose constituents are mentioned below, in the following percentages by weight:

| | | | |
|---|---|---|---|
| $SiO_2$ | 35-60%, | preferably | 39-55% |
| $Al_2O_3$ | 12-27%, | ... | 16-25% |
| CaO | 0-35%, | ... | 3-25% |
| MgO | 0-30%, | ... | 0-15% |
| $Na_2O$ | 0-17%, | ... | 6-12% |
| $K_2O$ | 0-17%, | ... | 3-12% |
| $R_2O$ ($Na_2O + K_2O$) | 10-17%, | ... | 12-17% |
| $P_2O_5$ | 0-5%, | ... | 0-2% |
| $Fe_2O_3$ | 0-20%, | | |
| $B_2O_3$ | 0-8%, | ... | 0-4% |
| $TiO_2$ | 0-3%, | | | and which also includes at least one phosphorus compound capable of reacting at a temperature below 1000° C. with said fibers in order to form a coating on the surface of said fibers, said compound having a content, expressed by weight of phosphorus atoms varying from 0.0005%, especially more than 0.01% to 1%, but especially less than 0.5% of the total mass of the fibers, a phosphorus compound being a molecule in which the phosphorus atom(s) is (are) linked to at least one carbon atom, directly or via an oxygen atom.

Preferably, each phosphorus compound is a molecule in which the phosphorus atom(s) is (are) linked to at least one carbon atom, directly or via an oxygen atom.

Within the context of the present invention, the expression "thermally stable mineral wool" or "mineral wool having a thermal stability" is defined as being capable of exhibiting temperature resistance, that is to say capable of not slumping substantially when it is heated, especially up to temperatures of at least 1000° C.

In particular, a mineral wool is considered to be thermally stable if it meets the criteria defined by the draft standard "insulating materials: Thermal stability" as proposed by NORDTEST (NT FIRE XX-NORDTEST REMISS No. 1114-93).

This test defines a procedure for determining the thermal stability of a specimen of insulating material at a temperature of 1000° C. A specimen of insulating material (measuring especially 25 mm in height by 25 mm in diameter) is introduced into a furnace but allows the slump of the specimen to be observed as a function of the temperature to which the specimen is exposed.

The temperature of the furnace is increased at 5° C. per minute from room temperature up to at least 1000° C.

This draft standard defines an insulating material as being thermally stable if a specimen of this material slumps no more than 50% of its initial thickness before a temperature the 1000° C. is reached.

The coating formed on the surface of the high-temperature fibers has the remarkable property of being refractory and thus retarding the slump of a specimen of fibers of the selected composition, heated to temperatures that may be up to 1000° C.

The or each phosphorus compound may be a single molecule, that is to say, may contain only one phosphorus atom.

The phosphorus compound according to the invention may then be characterized in that the single phosphorus atom is directly linked only to oxygen or hydrogen atoms, that is to say, is linked to at least one carbon atom only by means of an oxygen atom. It may be, as an example, a mono-, di- or tri-phosphoric ester, or unsubstituted phosphonic or phosphinic esters, the carbon-based groups of these esters being alkyl, aryl, alkenyl, alkynyl, acyl or hydroxyalkyl compounds, which may possibly be of oligomeric or polymeric nature and/or contain one or more heteroatoms chosen from N, O or S.

It may alternatively be characterized in that the single phosphorus atom is directly linked to at least one carbon atom. It may be at least partially substituted phosphonic or phosphinic esters or acids (that is to say in which at least one of the hydrogen atoms linked to the phosphorus atom is substituted by a carbon-based substituent). The phosphorus compound in this case could equally be a mono-, di- or tri-phosphoric oxide. The various carbon-based groups of these compounds are alkyl, aryl, acyl or hydroxyalkyl compounds, which may possibly be of oligomeric or polymeric nature and/or contain one or more heteroatoms chosen from N, O or S.

The or each phosphorus compound according to the invention is, however, preferably a molecule made up of several identical or different unitary compounds such as described previously, linked together by covalent bonds. The phosphorus compound is then preferably an oligomer or polymer molecule, that is to say, that its structure may be represented as repeating constituent units. The number of these constituent units is advantageously between 2 and 100, especially 2 and 50, or even between 2 and 10. In the case of a molecule containing several phosphorus atoms, the key condition, in accordance with which the phosphorus atoms are linked to a carbon atom, must be seen as signifying that the large majority of the phosphorus atoms respect this condition, it being understood that, in a large molecule, the fact that a small fraction of the phosphorus atoms do not meet this condition is unable to substantially change the manner in which the technical problem is solved.

It may thus be a compound in which the majority (or even all) of the phosphorus atoms are linked together by an oxygen atom, for example phosphoric or phosphonic polyester-type compounds.

It is, however, more advantageous that the majority (or even all) of the phosphorus atoms be linked together via a carbon-based entity. The phosphorus compound then contains preferably a majority of phosphorus atoms linked together by a group comprising at least one carbon atom, this latter which may be linked directly or by means of an oxygen atom to at least one of the phosphorus atoms. Such a preferred compound may be represented according to the general formula (1) below:

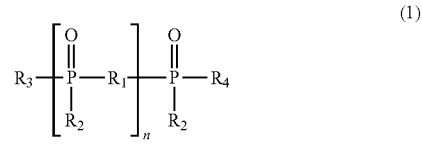

where:

n is between 1 and 100, preferably between 1 and 50, especially between 2 and 10; and the substituents $R_1$ to $R_4$ are identical or different, predominantly carbon-based entities, preferably of possibly branched alkyl, aryl, acyl or hydroxyalkyl type, which may possibly be of oligomeric or polymeric nature and/or contain one or more heteroatoms chosen from N, O, S or P. It is preferable that at least one of these substituents, especially the substituent $R_1$, contains an oxygen atom linked to the phosphorus atom of the main chain.

If two of the substituents contain an oxygen atom linked to the phosphorus atom of the main chain, the phosphorus compound is advantageously a phosphonic polyester-type oligomer or polymer of general formula (2) below:

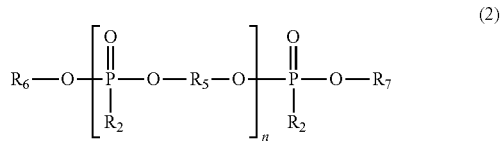

When all the substituents contain an oxygen atom linked to the phosphorus atom of the main chain, another family of preferred phosphorus compounds is made up of phosphoric polyacid- or polyester-type oligomers or polymers of general formula (3) below:

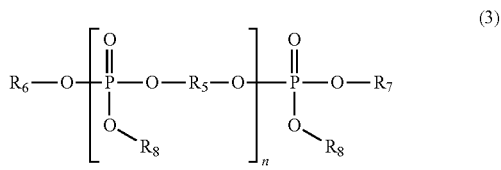

For these last two types of compounds:
- the chain length n is between 1 and 100, preferably between 1 and 50, especially between 2 and 10;
- the substituents $R_2$ and $R_5$ to $R_8$ are identical or different, predominantly carbon-based entities, preferably of possibly branched alkyl, aryl, acyl or hydroxyalkyl type, which may possibly be of oligomeric or polymeric nature and/or contain one or more heteroatoms chosen from N, O, S or P. The number of carbon atoms in each substituent is advantageously between 1 and 15, especially between 2 and 10. A large number of carbon atoms has in fact the disadvantage of generating a large quantity of carbon-based residues at the time of a temperature rise, whereas too small a number of carbon atoms may result in too easy a hydrolysis. The substituents $R_6$ to $R_8$ may also be hydrogen atoms or a neutralizing base for the phosphoric acid.

When the chain length n is equal to 1, it is possible that the $R_5$ and $R_6$ groups be linked together covalently, thus forming a cyclic molecule. When n is greater than 1, some $R_5$, $R_6$ or $R_7$ groups may be linked together covalently. A preferred phosphorus compound is thus the product sold under the trademark AMGARD® CT or CU by Rhodia. It is a mixture of two cyclic phosphonic esters of CAS numbers 41203-81-0 and 42595-45-9 respectively. The first one is a phosphonic ester according to the formula (2) with n=1, all the $R_2$ and $R_7$ groups being methyl groups, the $R_5$ and $R_6$ groups being linked together to form a single alkyl group having 6 carbon atoms. The second one is an ester of the same type, with however n=2, all the $R_2$ groups being methyl groups, the two $R_5$ groups being respectively linked to the $R_6$ and $R_7$ groups to form two $C_6$ alkyl groups.

The oligomeric or polymeric phosphorus compounds, presented thus far as linear or cyclic chains, may also be crosslinked networks, the various predominantly carbon-based substituents being able to be themselves linked to at least one other phosphorus atom, for example when these substituents are polyols or polyacids.

The latter compounds may in particular be obtained by esterification or transesterification reactions between acids or esters, that are phosphonic and phosphoric respectively, and polyols (in particular diols), polyacids (in particular diacids) or else epoxy compounds. Within this scope, molasses (a by-product of sugar refining) are a particularly attractive source of polyols or diols due to their low cost. It appeared that the phosphorus compounds according to the invention were able to be obtained by reaction between molasses and the phosphoric or phosphonic acids or esters, this reaction which may even be carried out by simultaneously spraying the two products on the fibers. Phosphorus-based starches may also be employed.

The mineral wool according to the invention may advantageously comprise a mixture of several phosphorus compounds such as described previously.

The point that is common to these compounds, which could be termed "organophosphorus compounds", is the presence of carbon-based compounds within the phosphorus chain itself, which seems to be the origin of the "blocking" of acid compounds, such as phosphoric acid, for temperatures below 200° C. and therefore of the stability of these compounds against the effects of temperature and moisture.

The phosphorus compound according to the invention is preferably present in an amount greater than or equal to 0.05%, especially 0.1%, and less than or equal to 2%, especially 1%. This quantity corresponds to the mass of phosphorus compounds relative to the total mass of fibers.

Considering the mass of phosphorus in these types of compounds, the mass content of phosphorus atoms relative to the mass of fibers is advantageously between 0.0005% to 1%, especially greater than or equal to 0.01% and even 0.1% and less than or equal to 0.5%.

The observed coating may be continuous on the surface of a fiber and its thickness is especially between 0.01 and 0.05 μm. Crystallization of a composition close to that of the coating may also be observed locally on the surface of the fibers and may reach thicknesses of around 0.1 to 0.5 μm.

According to one advantageous embodiment of the invention, the coating that can form on the surface of the mineral wool fibers potentially consists of an alkaline-earth metal phosphate.

Coatings are thus obtained in which the composition is close to that of crystals of the alkaline-earth metal orthophosphate or pyrophosphate type, the melting point of which is known to be above 1000° C.

Advantageously, the alkaline-earth metal phosphate that can form on the surface of the mineral wool fibers is a lime phosphate.

Lime phosphates, especially orthophosphates ($Ca_3(PO_4)_2$, or pyrophosphate ($Ca_2P_2O_7$), are known to be refractory and these compounds have melting points of 1670° C. and 1230° C. respectively.

As described in application WO 01/68546, a cooperative effect is observed between the fibers that form the subject of the selection of the above constituents and the phosphorus compounds. It may be considered that the phosphorus compound releases, at high temperature (but below 1000° C.), phosphoric acid and/or phosphoric anhydride, which starts to react with the fibers of the composition according to the invention. In the case of these compositions, the high alkaline metal content that they have may act as a compensator for the charge of a luminum, which is also present at high contents. Thus these are compositions in which the atomic mobility of the alkaline-earth metals is greater than that of these elements in other glass compositions. These relatively mobile alkaline-earth metals are then capable of reacting with the phosphoric acid or phosphoric anhydride to form a refractory compound, especially an alkaline-earth metal phosphate, and thus make it possible to ensure that the mineral wools according to the invention exhibit excellent thermal stability.

Thermally stable mineral wool capable of being dissolved in a physiological medium is thus obtained.

In the rest of the text, the term "composition" will refer to the ranges of the constituents of the fibers of the mineral wool, or of the glass intended to be fiberized in order to produce said fibers. Any percentage of a constituent of the composition must be understood to be a percentage by weight, and the compositions according to the invention may include up to 5%, especially 3%, of compounds considered as unanalyzed impurities, as is known in this kind of composition.

According to a variant of the invention, the composition of the mineral wool is as follows:

| | | | |
|---|---|---|---|
| $SiO_2$ | 39-55%, | preferably | 40-52% |
| $Al_2O_3$ | 16-27%, | ... | 16-25% |
| CaO | 3-35%, | ... | 10-25% |
| MgO | 0-15%, | ... | 0-10% |
| $Na_2O$ | 0-15%, | ... | 6-12% |
| $K_2O$ | 0-15%, | ... | 3-12% |
| $R_2O$ ($Na_2O + K_2O$) | 10-17%, | ... | 12-17% |
| $P_2O_5$ | 0-5%, | ... | 0-2% |
| $Fe_2O_3$ | 0-15%, | | |
| $B_2O_3$ | 0-8%, | ... | 0-4% |
| $TiO_2$ | 0-3%, | | |

MgO being between 0 and 5%, especially between 0 and 2% when $R_2O \leq 13.0\%$.

By selecting such a composition it is possible to combine the whole series of advantages, especially by varying the many complex roles that a number of its specific constituents play.

Specifically, it has been found that the combination of a high alumina content, of between 16 and 27%, preferably greater than 17% and/or preferably less than 25%, especially less than 22%, for a sum of network-forming elements, namely silica and alumina, of between 57 and 75%, preferably greater than 60% and/or preferably less than 72%, especially 70%, with a high quantity of alkali metals ($R_2O$: sodium and potassium) between 10 and 17%, with MgO between 0 and 5%, especially between 0 and 2%, when $R_2O \leq 13.0\%$, makes it possible to obtain glass compositions possessing the remarkable property of being fiberizable within a very wide range of temperatures and imparting biosolubility in acid pH on the fibers obtained. According to embodiments of the invention, the alkali metal content is preferably greater than 12%, especially 13.0% and 13.3%, and/or preferably less than 15%, especially less than 14.5%.

This compositional range proves to be particularly beneficial as it has been observed, contrary to received opinion, that the viscosity of the molten glass does not decrease significantly with an increase in alkali metal content. This remarkable effect makes it possible to increase the difference between the temperature corresponding to the viscosity for fiberizing and the liquidus temperature of the phase that crystallizes, and thus to considerably improve the fiberizing conditions and especially makes it possible to fiberize a new family of biosoluble glasses by internal centrifugation.

According to one embodiment of the invention, the compositions have an iron oxide content of between 0 and 5%, especially greater than 0.5%, and/or less than 3%, especially less than 2.5%. Another embodiment is obtained with compositions that have an iron oxide content of between 5 and 12%, especially between 5 and 8%, thereby making it possible to obtain fire-resistant mineral wool blankets.

Advantageously, the compositions according to the invention satisfy the relationship: $(Na_2O+K_2O)/Al_2O_3 \geq 0.5$, preferably $(Na_2O+K_2O)/Al_2O_3 \geq 0.6$, especially $(Na_2O+K_2O)/Al_2O_3 \geq 0.7$, which appears to favor the temperature corresponding to the viscosity for fiberizing higher than the liquidus temperature being obtained.

According to a variant of the invention, the compositions according to the invention preferably have a line content of between 10 and 25%, especially greater than 12%, preferably greater than 15%, and/or preferably less than 23%, especially less than 20% and even less than 17%, combined with a magnesia content of between 0 and 5%, preferably with less than 2% magnesia, especially less than 1% magnesia, and/or a magnesia content greater than 0.3%, especially greater than 0.5%.

According to another variant, the magnesia content is between 5 and 10% for a line content between 5 and 15%, and preferably between 5 and 10%.

By adding $P_2O_5$, which is optional, with contents of between 0 and 3%, especially greater than 0.5% and/or less than 2%, makes it possible to increase the biosolubility in neutral pH. Optionally, the composition may also contain boron oxide, which may help to improve the thermal properties of the mineral wool, especially by tending to lower its thermal conductivity coefficient in the radiative component and also to increase the biosolubility in neutral pH. It may also include $TiO_2$ in the composition, optionally, for example up to 3%. Other oxides, such as BaO, SrO, MnO, $Cr_2O_3$, $ZrO_2$ and $SO_3$ may be present in the composition, with a total content not exceeding 5%, preferably about 3 or 2%, and even 1%. These various oxides may be intentionally added to the composition according to the invention, but in general they are present as inevitable impurities resulting from the batch materials, from the refractory materials in contact with the glass, or from the refining agents employed to reduce the amount of gaseous inclusions in the mass of molten glass.

According to one particularly preferred embodiment of the invention, the mineral wool comprises fibers whose constituents are mentioned below, in the following percentages by weight:

| | | | |
|---|---|---|---|
| $SiO_2$ | 39-55%, | preferably | 40-52% |
| $Al_2O_3$ | 16-27%, | ... | 16-26% |
| CaO | 6-20%, | ... | 8-18% |
| MgO | 0-5%, | ... | 1-4.9% |
| $Na_2O$ | 0-15%, | ... | 2-12% |
| $K_2O$ | 0-15%, | ... | 2-12% |
| $R_2O$ ($Na_2O + K_2O$) | 10-14.7%, | ... | 10-13.5% |
| $P_2O_5$ | 0-3%, | especially | 0-2% |
| $Fe_2O_3$ (total iron) | 1.5-15%, | ... | 3.2-8% |
| $B_2O_3$ | 0-2%, | preferably | 0-1% |
| $TiO_2$ | 0-2%, | ... | 0.4-1%. |

These compositions by themselves have a remarkably improved high-temperature behavior.

It would seem that this composition range makes it possible for crystallization seeds to be nucleated at low temperature, these seeds causing the appearance or the growth of crystals at a sufficiently low temperature at which the softening or sintering of the material is not yet able to be effective. It may be considered that, by crystallizing components more fusible than the overall glass composition, the viscosity of the residual glass increases and the surface forces involved for sintering are no longer high enough to prevail over the viscous cohesion forces.

Preferably, the alumina is present in an amount of 17 to 25.5%, especially 20 to 25%, in particular 21 to 24.5% and especially around 22 to 23 or 24% by weight.

Advantageously, good refractoriness may be obtained by adjusting the magnesia content, especially to at least 1.5%, in particular 2%, especially greater than or equal to 2.5% or 3%. A high magnesia content is conducive to a low-temperature crystallizing effect that opposes the lowering of viscosity generally observed at high temperature, and therefore prevents the material from sintering.

One advantageous composition selection consists in providing the required minimum amount of magnesia, this being greater the lower the amount of alumina.

Thus, when the alumina is present in an amount of at least 22% by weight, the amount of magnesia is preferably at least 1%, advantageously around 1 to 4%, preferably 1 to 2% and in particular 1.2 to 1.6%. The alumina content is preferably limited to 25% in order to preserve a sufficiently low liquidus temperature. When the alumina is present in a lower amount, for example around 17 to 22%, the amount of magnesia is preferably at least 2%, especially around 2 to 5%.

The lime is advantageously present at contents of between 9.5 and 20%, preferably between 10 and 18% and even more preferably from 11 to 16%.

The total amount of lime and magnesia may advantageously be around 14 to 20%, especially 15 to 19%.

The total amount of alkaline-earth metal oxides (lime, magnesia, barium oxide and strontium oxide) is preferably between 10 and 20%, especially from 12 to 18%.

The amount of silica is advantageously around 35 to 50%, especially 37 to 48% and more particularly 39 to 44%, by weight.

Depending on the embodiments of the invention, the alkali metal oxide content is preferably less than or equal to 13.2%, or even 13.0%, especially around 10 to 12.5% and in particular 10.2 to 12% or less. Sodium oxide and potassium oxide may each be present in an amount of 3 to 9% by weight.

Within this range of alkali metal oxide contents, it proves advantageous to choose a ratio of the alkali metal oxide content to alumina content such that the $R_2O/Al_2O_3$ molar ratio is less than 1, in particular less than 0.9, especially at most 0.8 and in particular at most 0.75.

When the molar ratio is greater than 0.9, it is preferable for the magnesia content to be high enough to produce a low-temperature crystallizing effect, for example at least 2%, or at least 2.5%, otherwise excessively low glass transition temperatures would be obtained, with a deleterious effect on the behavior at very high temperature.

An $R_2O/Al_2O_3$ molar ratio of less than 0.9 produces a favorable effect on refractoriness, in particular at low temperature, and therefore on the softening point and the sintering temperature.

However, within this composition range a sufficiently large difference is maintained between the temperature corresponding to the viscosity for fiberizing and the liquidus temperature of the phase that crystallizes—thus giving good fiberizing conditions.

The iron oxide present in the composition has a positive impact on the nucleation of growth of seeds at low temperature, while still limiting the liquidus. However, its amount is preferably limited so as not to adversely affect biosolubility in acid medium. In a preferred embodiment of the invention, the compositions have iron oxide contents of between 2 and 6%, preferably around 3 to 6%.

The titanium oxide provides a very noticeable effect on the nucleation at high and low temperature of spinels within the glassy matrix. A content of the order of 1% or less may prove to be advantageous.

$P_2O_5$ may be used, at contents of between 0 and 3%, especially between 0.1 and 1.2%, to increase the biosolubility at neutral pH.

Other oxides, such as BaO, SrO, MnO, $Cr_2O_3$ and $ZrO_2$, may be present in the composition, with a maximum total content of 5%, or even 2%, and even 1%.

The difference between the temperature corresponding to a viscosity of $10^{2.5}$ poise (decipascal.second), denoted by $T_{log2.5}$, and the liquidus of the crystallizing phase, denoted by $T_{liq}$, is preferably at least 10° C. This difference, $T_{log2.5}-T_{liq}$, defines the "working range" for the compositions of the invention, that is to say the temperature range within which fiberization is possible, most particularly by an internal centrifugal process. This difference is preferably at least 20 or 30° C., and even more than 50° C., especially more than 100° C.

The compositions according to the invention have high glass transition temperatures, especially above 600° C. Their annealing temperature, denoted by $T_{annealing}$, is especially above 600° C.

As mentioned above, the mineral wool exhibits a satisfactory level of biosolubility especially at acid pH. It thus has in general a rate of dissolution, especially measured on silica, of at least 30 and preferably at least 40 or 50 ng/cm² per hour measured at pH 4.5 using a method similar to that described in the NF T 03-410 standard.

Another very important advantage of the invention relates to the possibility of using inexpensive batch materials to obtain the composition of these glasses. These compositions may especially result from the melting of rock, for example of the phonolite type, with an alkaline-earth metal carrier, for example limestone or dolomite, if necessary supplemented with iron ore. By this means, a moderate-cost alumina carrier is obtained.

This type of composition, with a high alumina content and a high alkali metal oxide content, may advantageously be melted in fired glass furnaces or electric glass furnaces.

The subject of the invention is also a process for obtaining mineral wool according to the invention, which includes a step of fiber-forming followed by a step of supplying, especially by spraying or impregnation of a solution, at least one phosphorus compound onto the surface of said fibers.

The subject of the invention is also a thermal and/or acoustic insulation product comprising at least one mineral wool according to the invention.

The invention also relates to the use of the mineral wool described above in fire-resistant structural systems.

The expression "fire-resistant structural systems" is understood to mean systems generally comprising assemblies of materials, especially based on mineral wool and metal plates, that can effectively retard the propagation of heat and also provide protection against flames and hot gases and maintain mechanical strength during a fire.

Standardized tests define the degree of fire resistance, expressed especially as the time needed for a given temperature to be reached on the opposite side of the structural system that is exposed to a heat flux generated, for example, by the flames of a burner or by an electric furnace.

A structural system is considered to exhibit satisfactory fire resistance if it is able in particular to meet the requirements of one of the following tests:
  fire door test: tests on mineral fiber boards, as defined in the German standard DIN 18 089—Part 1 (or equivalent);
  fire behavior of building materials and elements, as defined in the German standard DIN 4102 (or equivalent). In particular, the standard DIN 4102—Part 5 is considered for full-scale tests so as to determine the fire resistance class, and/or the standard DIN 4102—Part 8 for tests on specimens with a small test bed; and
  normalized test OMI A 754 (18) (or equivalent), which describes the general fire resistance test requirements for "marine"-type applications, especially for ship bulkheads. These tests are carried out on large specimens, with 3 m by 3 m furnaces. Mention may be made, for example, of the case of a steel deck on which the required performance in the case of a fire on the insulation side is to meet the thermal insulation criterion for at least 60 minutes.

Other details and advantageous features will become apparent from the description below of nonlimiting preferred embodiments.

Table 1 below gives the compositions of the fibers, in percentages by weight, of sixty examples.

The "impurities" line corresponds to the inevitable impurities resulting from the batch materials, from the refining agents or from the refractory materials in contact with the molten glass, treated globally. Only their total content is indicated, purely by way of indication, as neither their content, in general less than 2%, or even less than 1%, nor their nature affect the way in which the examples according to the invention solve the stated problem.

The compositions according to these examples can be fiberized by an internal centrifugal process, especially according to the teaching of the aforementioned Patent WO 93/02977.

Their working ranges, defined by the difference $T_{log2.5} - T_{liq}$, are largely positive, especially greater than 50° C., or even 100° C. and even greater than 150° C.

The liquidus temperatures are relatively low, especially not exceeding 1200° C. and even 1150° C.

The temperatures ($T_{log2.5}$) corresponding to viscosities of $10^{2.5}$ poise are compatible with the use of centrifugal spinners for high-temperature fiberizing, especially under the operating conditions described in Application WO 93/02977.

The preferred compositions are in particular those in which $T_{log2.5}$ is less than 1350° C., preferably less than 1300° C.

Table 1 also indicates the annealing temperature (expressed in ° C.) and the rate of dissolution of the fibers at pH 4.5 (expressed in ng/cm².h). The latter quantity, measured according to the protocol indicated in standard NF T 03-410, is greater than 30 ng/cm².h.

To illustrate the present invention, various phosphorus compounds were added during the fiberizing process, by spraying them, in a zone located after the zone in which the fibers are attenuated from the molten glass and before the zone in which the mineral wool is collected. The term "adjuvants" refers to the compounds added in this spraying zone, which adjuvants may be supplied simultaneously or separately.

The composition of example 45 of Table 1 was fiberized by the internal centrifugal process with or without the presence of various phosphorus-based compounds, in order to obtain mineral wool blankets, and the results of mechanical thermo stability tests are given in Table 2.

In these tests, the adjuvant comprises a resin-based binder and, in certain examples, a phosphorus compound added to this binder and sprayed at the same time as the latter.

The resin-based binders, well-known in the mineral wool field, have the function of giving the fiber blanket the desired mechanical strength. Within the context of the present tests, a standard binder based on a phenol-formaldehyde resin and urea has been employed. Other types of sizing composition, in particular those that are formaldehyde-free, may, of course, also be used, alone or in mixtures. They may be for example:

compositions based on an epoxy resin of the glycidyl ether type and a non-volatile amine hardener (described in Application EP-A-0 369 848), which may also comprise an accelerator chosen from imidazoles, imidazolines and mixtures thereof;

compositions comprising a carboxylic polyacid and a polyol, preferably combined with a catalyst of the alkali metal salt of a phosphorus-containing organic acid type (described in Application EP-A-0 990 727);

compositions comprising one or more compounds incorporating a carboxylic functional group and/or a β-hydroxyalkylamide functional group (described in Application WO-A-93/36368);

compositions incorporating either a carboxylic acid and an alkanolamine, or a resin previously synthesized from a carboxylic acid and from an alkanolamine, and a polymer containing a carboxylic acid group (described in Application EP-A-1 164 163);

sizing compositions prepared in two steps consisting in mixing an anhydride and an amine under reactive conditions until the anhydride is substantially dissolved in the amine and/or has reacted with it, then in adding water and terminating the reaction (described in Application EP-A-1 170 265);

compositions containing a resin that comprises the polymer-free reaction product of an amine with a first anhydride and a second anhydride that is different from the first (described in Application EP-A-1 086 932);

compositions containing at least one polycarboxylic acid and at least one polyamine;

compositions comprising copolymers of carboxylic acid and of monomers containing alcohol functional groups such as described in Application US 2005/038193; and compositions comprising polyols and polyacids or polyanhydrides such as maleic acid, described for example in Patent WO 2005/87837 or in Application U.S. Pat. No. 6,706,808.

These application or patents EP-A-0 369 848, EP-A-0 990 727, WO-A-93/36368, EP-A-1 164 163, EP-A-1 170 265, EP-A-1 086 932, US 2005/038193, WO 2005/87837, U.S. Pat. No. 6,706,808 are incorporated as reference into the present application, along with applications WO 04/007395, WO 2005/044750, WO 2005/121191, WO 04/094714, WO 04/011519, US 2003/224119, US 2003/224120.

Aminoplast type resins (melamine-formaldehyde or urea-formaldehyde) may also be used within the scope of the invention.

Comparative example A contained no phosphorus compounds and there formed only the resin-based binder as adjuvant.

In the case of the other examples, six different phosphorus compounds were employed. The first three were mineral phosphates or polyphosphates quite similar to those described in application WO 01/68546 and were employed in comparative examples B, C and D. These were the following:

sodium metaphosphate. Comparative example B contained 0.2% thereof;

a flame retardant with the trade name "EXOLIT AP 462" produced by Clariant GmbH. Based on a ammonium polyphosphate and melamine, it is especially used to improve the fire resistance of polymers (polyurethanes, epoxy resins) and has a very low water solubility. Comparative example C contained 0.2% thereof; and a flame retardant with the brand name "FR CROS 489" sold by Buddenheim (CAS No. 68333-79-9). This product is an ammonium polyphosphate containing 64% phosphorus expressed in $P_2O_5$ form. Comparative example D contained 0.2% thereof.

The other three phosphorus compounds were "organophosphorus" compounds employed within the context of the present invention. These were the following:

a flame retardant with the trade name "EXOLIT OP 550" produced by Clariant GmbH. Based on a phosphoric polyester type oligomer, it is especially used as an agent for protecting polyurethanes against fire. Examples E, F and G according to the invention respectively contained 0.3%, 0.5% and 0.7% of it relative to the total mass of fibers; and a flame retardant with a brand name "EXOLIT OP 560" produced by Clariant GmbH. Based on an oligomer of the phosphonic polyester type, it is employed in particular as an agent for protecting polyurethanes against fire. Example H according to the invention contained 0.5% thereof; and a flame retardant with the trade name "FYROL PNX" sold by Akzo Nobel, containing 19% of $P_2O_5$. It is a phosphoric polyester type oligomer of formula (3) in which n varies between 2 and 20, $R_6$, $R_7$ and $R_8$ are ethyl groups and $R_5$ is an ethylene group (CAS number 184538-58-7). Example I according to the invention contained 0.8% of it.

These three compounds contain phosphorus atoms and carbon-containing entities, in particular of the alkyl type, in their main chain.

Among other examples of phosphorus compounds according to the invention are the products BUDIT 341 or 3118F sold by Buddenheim. The mixture of cyclic phosphonic esters sold under the trademark AMGARD® CT or CU by Rhodia is also particularly interesting. This product, used as a fire retardant for polyester-based textiles, has in fact a higher stability than the product EXOLIT OP 550 at the temperature of the oven, and thus makes it possible to obtain better mechanical properties before aging. Its $P_2O_5$ content is about 20%.

Table 2 gives, for all of these tests, the initial mechanical strength of the mineral wool products obtained and the loss of their mechanical strength (as a relative percentage) after ageing in an autoclave at 105° C. under a pressure of 1.5 bar for 15 minutes, and for some of these tests the slump at 1000° C., according to the draft standard "insulating materials: thermal stability" mentioned above.

The mechanical strength was measured before and after autoclave ageing by tensile tests carried out on specimens in the form of rings cut from the fibrous products with a density of 14 kg/m³. According to this test, two pins were introduced into the center of the ring and moved apart at a constant rate until the specimen broke. This strength, expressed in N/g, corresponds to the force at break divided by the mass of the specimen. The test was repeated on twenty specimens, the average of the results obtained being indicated in the table.

TABLE 2

|  |  | Mechanical strength (N/g) | Loss of mechanical strength after accelerated ageing (%) | Slump at 1000° C. (%) |
|---|---|---|---|---|
| Comparative examples | A | 2.7 | 28 | 89 |
|  | B | 2.6 | 44 | 40 |
|  | C | 2.3 | 36 |  |
|  | D | 2.8 | 39 |  |
| Examples according to the invention | E | 3.1 | 22 | 40 |
|  | F | 3.2 | 29 |  |
|  | G | 3.3 | 17 |  |
|  | H | 3.1 | 28 |  |
|  | I | 3.0 | 27 | 30 |

These results clearly show that the addition of phosphorus compounds such as those described in the prior art (examples B, C and D) do not improve the initial mechanical strength properties or degrade them (upon leaving the oven) and also greatly degrade the variation in these properties over time compared with the case in which no phosphorus compound was added (example A).

In contrast, the use of the phosphorus compounds within the context of the present invention, on the one hand, improves the initial mechanical properties of the product and, on the other hand, either does not degrade the variation in these properties after accelerated ageing (examples F, H and I) or even improves them (examples E and G).

Without wishing to be tied by any scientific theory, the beneficial effect of adding the compounds according to the invention seems to be due to the absence of acid compounds being liberated, such as phosphoric acid and/or phosphoric anhydride, during the oven treatment for curing the resin of the binder and during the accelerated ageing treatment on the end product. This is because it seems that the liberation of acid compounds causes the adhesion between the binder and the glass fibers to be reduced and/or attacks the surface of the fibers. It has also been demonstrated independently of the present invention that the addition of a base (such as MgO) as additional adjuvant makes it possible to neutralize the acids formed during this binder curing step and offers advantages with regard to the variation in mechanical properties over time of the products thus formed.

The beneficial effect of all these types of phosphates (comparative example B or examples E and I according to the invention) on the thermal stability is also confirmed, the slump at 1000° C. being reduced by at least a factor of two compared with that of fibers without phosphate compounds.

TABLE 1

|  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| $SiO_2$ | 47.7 | 42.6 | 44.4 | 45.2 | 45.4 | 43.9 | 44.2 | 43.8 | 46.1 |
| $Al_2O_3$ | 18.6 | 18.1 | 17.3 | 17.2 | 18.1 | 17.6 | 17.6 | 17.6 | 17.4 |
| CaO | 6.2 | 22.7 | 21.7 | 15.3 | 13.5 | 15 | 13.3 | 14.2 | 13.2 |
| MgO | 7.1 | 0.2 | 0.4 | 0.5 | 0.5 | 0.5 | 0.5 | 0.5 | 0.5 |
| $Na_2O$ | 8.0 | 6.3 | 6.0 | 6.2 | 6.5 | 6.40 | 6.3 | 6.4 | 6.3 |
| $K_2O$ | 5.2 | 7.4 | 7.1 | 7.8 | 8.1 | 7.6 | 7.9 | 7.9 | 7.8 |
| $Fe_2O_3$ | 7.2 | 2.5 | 3 | 6.6 | 7.3 | 8.4 | 9.8 | 9.2 | 8.3 |
| Impurities | 0 | 0.2 | 0.1 | 1.2 | 0.6 | 0.6 | 0.4 | 0.4 | 0.4 |
| $SiO_2 + Al_2O_3$ | 66.3 | 60.7 | 61.7 | 62.4 | 63.5 | 61.5 | 61.8 | 61.4 | 63.5 |
| $Na_2O + K_2O$ | 13.2 | 13.7 | 13.1 | 14 | 14.6 | 14.2 | 14.2 | 14.3 | 14.1 |
| $(Na_2O + K_2O)/Al_2O_3$ | 0.71 | 0.76 | 0.76 | 0.81 | 0.81 | 0.81 | 0.81 | 0.81 | 0.81 |
| $T_{log2.5}$ (in ° C.) | 1293 | 1239 | 1230 | 1248 | 1280 | 1270 | 1285 | 1275 | 1310 |
| $T_{liq}$ (in ° C.) | 1260 | 1200 | 1190 | 1160 | 1160 | 1120 | 1100 | 1110 | 1140 |
| $T_{log2.5} - T_{liq}$ (in ° C.) | +33 | +39 | +40 | +88 | +120 | 150 | 185 | 165 | 170 |
| $T_{annealing}$ (in ° C.) | 622 | 658 |  | 634 | 631 | 618 |  |  |  |
| Dissolution rate at pH = 4.5 (in ng/cm² per h) | ≥30 | ≥30 | ≥30 | 107 | 107 | 45 | ≥30 | ≥30 | ≥30 |

|  | Ex. 10 | Ex. 11 | Ex. 12 | Ex. 13 | Ex. 14 | Ex. 15 | Ex. 16 | Ex. 17 | Ex. 18 | Ex. 19 | Ex. 20 | Ex. 21 |
|---|---|---|---|---|---|---|---|---|---|---|---|---|
| $SiO_2$ | 43.8 | 47.1 | 41.9 | 48.2 | 43.2 | 46.3 | 45.4 | 43 | 44.3 | 43 | 47.7 | 45.6 |
| $Al_2O_3$ | 17.6 | 15.7 | 20.9 | 19.8 | 22.5 | 19.3 | 18.8 | 19.7 | 19.8 | 21.5 | 18.4 | 22.4 |

TABLE 1-continued

| | | | | | | | | | | | | |
|---|---|---|---|---|---|---|---|---|---|---|---|---|
| CaO | 11.9 | 9.8 | 14.5 | 14 | 14.3 | 13.9 | 13.9 | 14.1 | 13.4 | 14.1 | 13.8 | 13.9 |
| MgO | 0.5 | 0.4 | 0.5 | 0.5 | 0.5 | 0.5 | 0.5 | 0.5 | 0.7 | 0.5 | 0.5 | 0.5 |
| $Na_2O$ | 6.4 | 6.4 | 6.1 | 6 | 6 | 6 | 5.9 | 6 | 8.3 | 6 | 6 | 6 |
| $K_2O$ | 8.0 | 8.0 | 7.4 | 7.2 | 7.1 | 7.1 | 7.2 | 7.2 | 3.7 | 7.3 | 7.3 | 7.3 |
| $Fe_2O_3$ | 11.3 | 12.1 | 8.7 | 4.2 | 6.3 | 6.8 | 8.3 | 9.5 | 9.3 | 7.5 | 6.2 | 4.2 |
| Impurities | 0.5 | 0.5 | 0 | 0.1 | 0.1 | 0.1 | 0 | 0 | 0.5 | 0.1 | 0.1 | 0.1 |
| $SiO_2 + Al_2O_3$ | 61.4 | 62.8 | 62.8 | 68 | 65.7 | 65.6 | 64.2 | 62.7 | 63.8 | 64.5 | 66.1 | 68 |
| $Na_2O + K_2O$ | 14.4 | 14.4 | 13.5 | 13.2 | 13.1 | 13.1 | 13.1 | 13.2 | 12 | 13.3 | 13.3 | 13.3 |
| $(Na_2O + K_2O)/Al_2O_3$ | 0.81 | 0.92 | 0.65 | 0.67 | 0.58 | 0.66 | 0.7 | 0.67 | 0.61 | 0.62 | 0.72 | 0.59 |
| $T_{log2.5}$ (in °C.) | 1295 | 1305 | 1300 | 1380 | 1345 | 1335 | 1315 | 1305 | 1250 | 1325 | 1345 | 1370 |
| $T_{liq}$ (in °C.) | 1160 | 1200 | 1140 | 1160 | 1140 | 1110 | 1110 | 1110 | 1170 | 1140 | 1150 | 1150 |
| $T_{log2.5} - T_{liq}$ (in °C.) | 135 | 105 | 160 | 220 | 205 | 225 | 205 | 195 | 80 | 175 | 195 | 220 |
| $T_{annealing}$ (in °C.) | 615 | 616 | 635 | 654 | 655 | 645 | 637 | 638 | | 644 | 645 | 658 |
| Dissolution rate at pH = 4.5 (in $ng/cm^2$ per h) | 60 | ≥30 | ≥30 | ≥30 | ≥30 | ≥30 | ≥30 | ≥30 | ≥30 | ≥30 | ≥30 | ≥30 |

| | Ex. 22 | Ex. 23 | Ex. 24 | Ex. 25 | Ex. 26 | Ex. 27 | Ex. 28 | Ex. 29 | Ex. 30 | Ex. 31 | Ex. 32 | Ex. 33 |
|---|---|---|---|---|---|---|---|---|---|---|---|---|
| $SiO_2$ | 43.5 | 43.1 | 40.3 | 42.3 | 43.9 | 41.5 | 39.3 | 47.3 | 45.3 | 45.3 | 44 | 46.5 |
| $Al_2O_3$ | 21.2 | 22.2 | 25.1 | 21.7 | 24.6 | 24.7 | 24.9 | 18.2 | 19.2 | 20.5 | 22.5 | 19.2 |
| CaO | 14.1 | 14 | 13.9 | 13.1 | 13.2 | 13.4 | 13.3 | 13.9 | 12.9 | 12.9 | 12.7 | 12.4 |
| MgO | 0.5 | 0.5 | 0.5 | 0.6 | 0.6 | 0.6 | 0.5 | 0.6 | 0.8 | 0.8 | 0.8 | 0.8 |
| $Na_2O$ | 6 | 6 | 6 | 5.9 | 5.9 | 6.2 | 6.3 | 8.1 | 7.9 | 8.3 | 7.9 | 8.8 |
| $K_2O$ | 7.2 | 7.2 | 7.2 | 7.7 | 7.6 | 7.6 | 7.6 | 3.9 | 5.7 | 3.8 | 3.7 | 3.9 |
| $Fe_2O_3$ | 7.4 | 6.9 | 6.9 | 8.7 | 4 | 6 | 8.1 | 7.5 | 7.5 | 7.4 | 7.5 | 7.4 |
| Impurities | 0.1 | 0.1 | 0.1 | 0 | 0.2 | 0 | 0 | 0.5 | 0.7 | 1.0 | 0.9 | 1.0 |
| $SiO_2 + Al_2O_3$ | 64.7 | 65.3 | 65.4 | 64.0 | 68.5 | 66.2 | 64.2 | 65.5 | 64.5 | 65.8 | 66.5 | 65.7 |
| $Na_2O + K_2O$ | 13.2 | 13.2 | 13.2 | 13.6 | 13.5 | 13.8 | 13.9 | 11.9 | 13.6 | 12.1 | 11.6 | 12.7 |
| $(Na_2O + K_2O)/Al_2O_3$ | 0.62 | 0.59 | 0.53 | 0.63 | 0.55 | 0.52 | 0.56 | 0.65 | 0.7 | 0.59 | 0.52 | 0.66 |
| $T_{log2.5}$ (in °C.) | 1325 | 1335 | 1330 | 1300 | 1370 | 1330 | 1295 | 1270 | 1270 | 1280 | 1285 | 1280 |
| $T_{liq}$ (in °C.) | 1120 | 1160 | 1170 | 1160 | | 1180 | 1200 | 1160 | 1150 | 1180 | 1200 | 1150 |
| $T_{log2.5} - T_{liq}$ (in °C.) | 205 | 175 | 160 | 140 | | 150 | 95 | 110 | 120 | 100 | 85 | 130 |
| $T_{annealing}$ (in °C.) | 644 | 650 | 652 | | | | | | 625 | | | 618 |
| Dissolution rate at pH = 4.5 (in $ng/cm^2$ per h) | ≥30 | ≥30 | ≥30 | ≥30 | ≥30 | ≥30 | ≥30 | ≥30 | ≥30 | ≥30 | ≥30 | ≥30 |

| | Ex. 34 | Ex. 35 | Ex. 36 | Ex. 37 | Ex. 38 | Ex. 39 | Ex. 40 | Ex. 41 | Ex. 42 |
|---|---|---|---|---|---|---|---|---|---|
| $SiO_2$ | 46.5 | 47.7 | 46.5 | 48.0 | 47.1 | 46 | 46 | 43 | 46.3 |
| $Al_2O_3$ | 19.5 | 18.9 | 19.5 | 19.2 | 21 | 20.5 | 20.1 | 23.3 | 18.8 |
| CaO | 11.5 | 13.6 | 14.4 | 13.6 | 12.6 | 11.6 | 14.4 | 15.7 | 10.1 |
| MgO | 0.7 | 1.4 | 1.4 | 0.7 | 0.7 | 0.7 | 1.1 | 0.2 | 3.5 |
| $Na_2O$ | 8.4 | 7.4 | 7.3 | 7.4 | 7.2 | 7.4 | 7.1 | 7.2 | 8 |
| $K_2O$ | 5 | 5 | 5 | 5 | 5 | 5 | 5 | 4.9 | 5 |
| $Fe_2O_3$ | 7.5 | 4.8 | 4.9 | 4.9 | 4.9 | 7.3 | 4.9 | 4.9 | 7.7 |
| Impurities | 0.9 | 1.2 | 1.0 | 1.2 | 1.5 | 1.5 | 1.4 | 0.8 | 0.6 |
| $SiO_2 + Al_2O_3$ | 66 | 66.6 | 66.0 | 67.2 | 68.1 | 66.5 | 66.1 | 66.3 | 65.1 |
| $Na_2O + K_2O$ | 13.4 | 12.4 | 12.3 | 12.4 | 12.2 | 12.4 | 12.1 | 12.1 | 13 |
| $T_{log2.5}$ (in °C.) | 1295 | 1310 | 1295 | 1315 | 1340 | 1320 | 1300 | 1290 | 1300 |
| $T_{liq}$ (in °C.) | 1170 | 1140 | 1150 | 1120 | 1110 | 1120 | 1140 | 1140 | 1160 |
| $T_{log2.5} - T_{liq}$ (in °C.) | 125 | 170 | 145 | 195 | 230 | 200 | 160 | 150 | 140 |
| $T_{annealing}$ (in °C.) | 619 | 636 | 636 | 640 | 643 | 633 | 641 | 658 | |
| Dissolution rate at pH = 4.5 (in $ng/cm^2$ per h) | ≥30 | ≥30 | ≥30 | ≥30 | ≥30 | ≥30 | ≥30 | ≥30 | ≥30 |

| | Ex. 43 | Ex. 44 | Ex. 45 | Ex. 46 | Ex. 47 | Ex. 48 | Ex. 49 | Ex. 50 | Ex. 51 |
|---|---|---|---|---|---|---|---|---|---|
| $SiO_2$ | 47 | 42 | 41.9 | 43.3 | 42.4 | 42 | 43 | 43.1 | 43.1 |
| $Al_2O_3$ | 18.4 | 23.2 | 23.4 | 22.9 | 22.8 | 23.2 | 23 | 22.8 | 22.9 |
| CaO | 8.8 | 14.8 | 13.2 | 13.6 | 12.6 | 12.3 | 12.6 | 11.8 | 11.8 |
| MgO | 3.5 | 1.2 | 2.2 | 2.2 | 3.1 | 3.1 | 3.2 | 4 | 4.2 |
| $Na_2O$ | 7.6 | 6.3 | 6.2 | 6.7 | 6.0 | 7.0 | 6.9 | 6.2 | 6.8 |
| $K_2O$ | 4.2 | 4.5 | 5.3 | 4 | 5.1 | 5.3 | 4 | 5.5 | 4 |
| $Fe_2O_3$ | 6.9 | 5.4 | 5 | 5 | 5.1 | 4.7 | 5 | 5 | 5 |
| Impurities | 2.7 | 2.6 | 2.9 | 2.4 | 3.0 | 2.3 | 2.4 | 1.6 | 2.3 |
| $R_2O = Na_2O + K_2O$ | 12.8 | 10.8 | 11.5 | 10.7 | 11.1 | 12.3 | 10.9 | 11.7 | 10.8 |
| $T_{liq}$ (in °C.) | 1190 | 1140 | 1167 | 1170 | 1154 | 1204 | 1134 | 1174 | 1156 |
| $T_{log2.5}$ (in °C.) | | 1274 | 1284 | 1279 | 1277 | 1279 | 1279 | 1281 | 1273 |
| $T_{log2.5} - T_{liq}$ (in °C.) | | 134 | 117 | 109 | 123 | 75 | 145 | 107 | 117 |
| $T_{annealing}$ (in °C.) | 677 | 709 | 707 | 697 | 707 | 696 | | | |
| Dissolution rate at pH = 4.5 (in $ng/cm^2$ per h) | ≥30 | ≥30 | ≥30 | ≥30 | ≥30 | ≥30 | ≥30 | ≥30 | ≥30 |

TABLE 1-continued

| | Ex. 52 | Ex. 53 | Ex. 54 | Ex. 55 | Ex. 56 | Ex. 57 | Ex. 58 | Ex. 59 | Ex. 60 |
|---|---|---|---|---|---|---|---|---|---|
| $SiO_2$ | 43 | 41.7 | 41.5 | 40.5 | 41.9 | 41.5 | 40.9 | 41.5 | 42.1 |
| $Al_2O_3$ | 23.4 | 24.5 | 24.5 | 24.9 | 23.9 | 25.8 | 24.7 | 25.3 | 23.5 |
| CaO | 10 | 14.3 | 14.2 | 13.7 | 13.3 | 12.4 | 12.5 | 10.2 | 13.2 |
| MgO | 4.2 | 1.1 | 1.7 | 2.0 | 2.1 | 3 | 3.06 | 5.2 | 2.1 |
| $Na_2O$ | 6.6 | 5.2 | 5.2 | 5.3 | 5 | 6.3 | 4.4 | 6.4 | 6.9 |
| $K_2O$ | 3.9 | 5.9 | 5.2 | 6 | 6.4 | 4 | 6.8 | 4.5 | 5.2 |
| $Fe_2O_3$ | 5 | 4.9 | 5.2 | 4.6 | 4.5 | 5 | 4.4 | 5.3 | 4.7 |
| $B_2O_3$ | 1.5 | | | | | 0 | | 0 | |
| Impurities | 2.5 | 2.5 | 2.7 | 3.0 | 3.0 | 2.0 | 3.1 | 1.8 | 2.3 |
| $R_2O = Na_2O + K_2O$ | 10.5 | 11.1 | 10.4 | 11.3 | 11.4 | 10.3 | 11.2 | 10.9 | 12.1 |
| $T_{liq}$ (in ° C.) | 1175 | 1167 | 1194 | 1182 | | 1154 | 1220 | | 1164 |
| $T_{log2.5}$ (in ° C.) | 1279 | 1298 | 1293 | 1285 | | 1297 | | | 1284 |
| $T_{log2.5} - T_{liq}$ (in ° C.) | 104 | 131 | 99 | 103 | | 143 | | | 120 |
| $T_{annealing}$ (in ° C.) | | 722 | 712 | 710 | 713 | | 714 | | 698 |
| Dissolution rate at pH = 4.5 (in ng/cm² per h) | ≥30 | ≥30 | ≥30 | ≥30 | ≥30 | ≥30 | ≥30 | ≥30 | ≥30 |

The invention claimed is:

1. A mineral wool in the form of a mat, comprising fibers whose constituents are mentioned below, in the following percentages by weight:
   $SiO_2$ 35-60%,
   $Al_2O_3$ 12-27%,
   CaO 0-35%,
   MgO 0-30%,
   $Na_2O$ 0-17%,
   $K_2O$ 0-17%,
   $R_2O$ ($Na_2O + K_2O$) 10-17%,
   $P_2O_5$ 0-5%,
   $Fe_2O_3$ 0-20%,
   $B_2O_3$ 0-8%,
   $TiO_2$ 0-3%,
   and a coating comprising at least one phosphorus compound capable of reacting at a temperature below 1000° C. with said fibers,
   wherein said mineral wool in the form of a mat is obtained by a process comprising spraying the at least one phosphorus compound onto the fibers during fiberizing and subsequently collecting the mineral wool,
   wherein said coating covers at least a portion of the surface of said fibers,
   wherein the phosphorus compound comprises at least one phosphorus linked by a covalent bond to at least one carbon, directly or via an oxygen, and
   wherein the mineral wool comprises the at least one phosphorous compound in an amount, expressed by weight of phosphorus atoms, of from 0.0005% to 1% of the total mass of the fibers.

2. The mineral wool as claimed in claim 1, wherein the at least one phosphorus compound is at least one selected from the group consisting of:
   a) a molecule comprising a single phosphorus linked by a covalent bond to at least one carbon, strictly by means of an oxygen; and
   b) a molecule comprising a single phosphorus linked by a covalent bond directly to at least one carbon.

3. The mineral wool as claimed in claim 2, wherein said molecule comprising a single phosphorus linked by a covalent bond to at least one carbon, through an oxygen, is a phosphoric monoester, a phosphoric diester, a phosphoric triester, an unsubstituted phosphonic ester, or a phosphinic ester, or mixtures thereof;
   wherein the carbon-based groups of these esters are alkyl, aryl, acyl or hydroxyalkyl compounds.

4. The mineral wool as claimed in claim 2, wherein said molecule comprising a single phosphorus linked by a covalent bond directly to at least one carbon is an at least partially substituted phosphonic ester, or phosphinic ester, di ester, or tri ester, or a phosphinic acid, or mixtures thereof;
   wherein the various carbon-based groups of these substituted compounds are alkyl, aryl, acyl or hydroxyalkyl compounds.

5. The mineral wool as claimed in claim 1, wherein said coating comprises two or more phosphorous compounds selected from the group consisting of:
   compound a) a molecule comprising a single phosphorus linked by a covalent bond to at least one carbon, strictly by means of an oxygen; and
   compound b) a molecule comprising a single phosphorus linked by a covalent bond directly to at least one carbon;
   wherein said compound a) and compound b) are identical or different, linked together by covalent bonds.

6. The mineral wool as claimed in claim 5, wherein said coating comprises a phosphorus compound which is an oligomer or polymer molecule, of which the number of constituent units is between 2 and 100.

7. The mineral wool as claimed in claim 5, wherein said coating comprises a phosphorus compound comprising predominantly phosphorus atoms linked together by a covalent bond via a carbon-based entity.

8. The mineral wool as claimed in claim 7, wherein said coating comprises a phosphorus compound represented by formula (1):

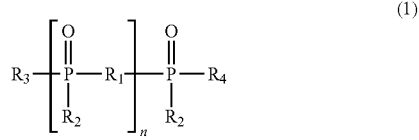

wherein:
n is between 1 and 100; and
the substituents $R_1$ to $R_4$ are identical or different and are predominantly carbon-based entities comprising at least one branched alkyl, aryl, acyl or hydroxyalkyl group.

9. The mineral wool as claimed in claim 8, wherein said coating comprises a phosphorus compound which is a phosphonic polyester oligomer or polymer represented by formula (2):

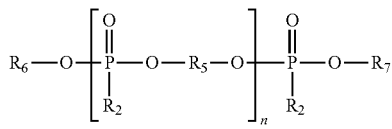
(2)

wherein:
the chain length n is between 1 and 100; and
the substituents $R_2$ and $R_5$ to $R_7$ are identical or different and are predominantly carbon-based entities comprising at least one branched alkyl, aryl, acyl or hydroxyalkyl group.

10. The mineral wool as claimed in claim 8, wherein said coating comprises a phosphorus compound is a phosphoric polyacid or polyester oligomer or polymer represented by formula (3):

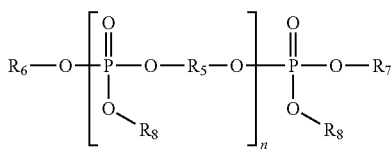
(3)

wherein:
the chain length n is between 1 and 100; and
the substituents $R_5$ to $R_8$ are identical or different and are predominantly carbon-based entities comprising at least one branched alkyl, aryl, acyl or hydroxyalkyl group.

11. The mineral wool as claimed in claim 4, wherein said at least one phosphorus compound is obtained by a process comprising esterifying or transesterifying acids or esters, that are phosphonic and phosphoric respectively, and polyols polyacids or epoxy compounds.

12. The mineral wool as claimed in claim 11, wherein said at least one phosphorus compound is obtained by a process comprising reacting molasses and the phosphoric or phosphonic acids or esters.

13. A mineral wool as claimed in claim 1, wherein the fibers comprise the following constituents in percentages by weight:
$SiO_2$ 39-55%,
$Al_2O_3$ 16-27%,
CaO 3-35%,
MgO 0-15%,
$Na_2O$ 0-15%,
$K_2O$ 0-15%,
$R_2O$ ($Na_2O + K_2O$) 10-17%,
$P_2O_5$ 0-5%,
$Fe_2O_3$ 0-15%,
$B_2O_3$ 0-8%,
$TiO_2$ 0-3%,
wherein MgO is between 0 and 5% when $R_2O$ 5 13.0%.

14. The mineral wool as claimed in claim 1, wherein the fibers comprise the following constituents in percentages by weight:
$SiO_2$ 39-55%,
$Al_2O_3$ 16-27%,
CaO 6-20%,
MgO 1-5%,
$Na_2O$ 0-15%,
$K_2O$ 0-15%,
$R_2O$ ($Na_2O + K_2O$) 10-14.7%,
$P_2O_5$ 0-3%,
$Fe_2O_3$ (Total Iron) 1.5-15%,
$B_2O_3$ 0-2%,
$TiO_2$ 0-2%.

15. The mineral wool as claimed in claim 1, wherein the CaO content is 9.5 to 20%.

16. The mineral wool as claimed in claim 1, comprising 20 to 25% alumina.

17. A mineral wool as claimed in claim 1, comprising at least 2% MgO when the alumina is present in an amount of less than 22%, and comprising 1 to 4%, MgO when the alumina is present in an amount of at least 22% by weight.

18. The mineral wool as claimed in claim 1, wherein the alkaline metal content is less than or equal to 13.0%.

19. The mineral wool as claimed in claim 1, wherein the $R_2O/Al_2O_3$ molar ratio is less than 0.9.

20. The mineral wool as claimed in claim 1, comprising 2 to 6% iron oxide.

21. The mineral wool as claimed in claim 1, comprising 1% titanium oxide or less.

22. The mineral wool as claimed in claim 1, wherein the fibers have a rate of dissolution of at least 30 ng/cm² per hour measured at pH 4.5.

23. The mineral wool as claimed in claim 1, wherein the glass of the fibers may be fiberized by the internal centrifugal process.

24. The mineral wool as claimed in claim 1, wherein the coating consists essentially of an alkaline-earth metal phosphate.

25. The mineral wool as claimed in claim 24, wherein the alkaline-earth metal phosphate is a lime phosphate.

26. A process for obtaining mineral wool as claimed in claim 1, comprising a step of fiber-forming followed by a step of supplying at least one phosphorus compound onto the surface of said fibers.

27. A fire-resistant structural system comprising the mineral wool as claimed in claim 1.

28. A thermal and/or acoustic insulation product comprising at least one mineral wool as claimed in claim 1.

29. The mineral wool as claimed in claim 3, wherein the carbon-based groups of said esters are oligomeric or polymeric.

30. The mineral wool as claimed in claim 3, wherein the carbon-based groups of said esters further comprise at least one heteroatom selected from the group consisting of N, O and S.

31. The mineral wool as claimed in claim 4, wherein the carbon-based groups of said esters are oligomeric or polymeric.

32. The mineral wool as claimed in claim 4, wherein the carbon-based groups of said esters further comprise at least one heteroatom selected from the group consisting of N, O and S.

33. The mineral wool as claimed in claim 1, wherein the coating consists essentially of the phosphorus compound or a mixture of phosphorous compounds.

* * * * *